US008755812B2

(12) United States Patent
Pan et al.

(10) Patent No.: US 8,755,812 B2
(45) Date of Patent: Jun. 17, 2014

(54) METHOD FOR TRANSMITTING AND RECEIVING UPLINK SOUNDING REFERENCE SIGNAL, BASE STATION AND MOBILE TERMINAL

(75) Inventors: Xueming Pan, Beijing (CN); Shiqiang Suo, Beijing (CN); Deshan Miao, Beijing (CN); Yu Ding, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 775 days.

(21) Appl. No.: 12/999,800

(22) PCT Filed: Jun. 19, 2009

(86) PCT No.: PCT/CN2009/000683
§ 371 (c)(1),
(2), (4) Date: Jan. 25, 2011

(87) PCT Pub. No.: WO2009/152696
PCT Pub. Date: Dec. 23, 2009

(65) Prior Publication Data
US 2011/0105167 A1 May 5, 2011

(30) Foreign Application Priority Data

Jun. 20, 2008 (CN) .......................... 2008 1 0115312

(51) Int. Cl.
*H04W 72/08* (2009.01)
*H04W 28/24* (2009.01)
(52) U.S. Cl.
USPC .................... 455/452.2; 455/450; 455/67.11; 455/423
(58) Field of Classification Search
None
See application file for complete search history.

(56) References Cited

FOREIGN PATENT DOCUMENTS

| CN | 101 192 875 | 6/2008 |
| WO | 2010/036053 | 4/2010 |

OTHER PUBLICATIONS

Samsung, "SRS indication for TDD"; 3GPP Draft; R1-081737, 3rd Generation Partnership Project(3GPP), Mobile Competence Centre; 650, Route Des Lucioles; F-06921 Sophia-Antipolis Cedex; France, vol. Ran WG1, No. Kansas City, USA; May 14, 2008, XP050110128; 4 sheets.

(Continued)

*Primary Examiner* — Philip Sobutka
(74) *Attorney, Agent, or Firm* — Fay Kaplun & Marcin, LLP (57) ABSTRACT

The field of wireless communications is related, especially the technique of transmitting uplink sounding reference signal (SRS) by a mobile terminal with multiple transmission antennas is related. A method for receiving uplink sounding reference signal includes the following steps: receiving the SRS signals, which are respectively transmitted from respective radio frequency transmission modules of the mobile terminal according to the respectively allocated Transmission Comb (TC) values and Cyclic Shift (CS) values when the transmission period arrives, wherein TC values and/or CS values allocated for any two radio frequency transmission modules are different; determining the radio frequency transmission module corresponding to every received SRS signal according to the TC values and CS values respectively allocated for respective radio frequency transmission modules. A device for receiving uplink sounding reference signal, a method and a device for transmitting uplink sounding reference signal are also provided. Because different TC values and/or different CS values are allocated for respective radio frequency transmission modules, (multiple) radio frequency transmission modules can transmit SRS signals through (multiple) transmission antennas during the same transmission period by way of Frequency Division Multiplex (FDM) or Code Division Multiplex (CDM).

17 Claims, 5 Drawing Sheets

(56) References Cited

OTHER PUBLICATIONS

NTT DoCoMo et al., "Multiplexing Method for Orthogonal Reference Signals for E-UTRA Uplink", 3PP Draft; R1-062726 UL Orthogonal Reference Signal, 3$^{rd}$ Generation Partnership Project (3GPP), Mobile Competence Centre; 650, Route Des Lucioles; F-06921 SophiaAntipolis Cedex; France, vol. Ran WG1, no. Seoul Korea; Oct. 4, 2006, XP 050103214; 13 sheets.

3GPP TS 36.211, "3$^{rd}$ Generation Partnership Project; Technical Specification Group Radio Access Network; Evolved Universal Terrestrial Radio Access (E-UTRA); Physical Channels and Modulation (Release 8)", vol. 8., 3.0, May 2008, pp. 1-77.

3 GPP TS 36.213, "3$^{rd}$ Generation Partnership Project; Technical Specification Group Radio Access Network; Evolved Universal Terrestrial Radio Access (E-UTRA); Physical Layer Procedures (Release 8), vol. 8, 2.0, Mar. 2008", pp. 1-30.

3GPP TSG Ran WG#49bis, R1-072988, Nokia Siemens Networks, Nokia, "UL Sounding Reference Signal", Jun. 25-29, 2007, 5 sheets.

3GPP TSG RAN WG1 Meeting #49, R1-072095, "Multiplexing of E-UTRA Uplink Sounding Reference Signals", Kobe, Japan, May 7-11, 2007, 3 sheets.

3GPP TSG RAN WG1 Meeting #49, Kobe, Japan, May 7-11, 2007, Huawei, *Multiplexing of E-UTRA Uplink Sounding Reference Signals*; 3 sheets.

3GPP TSG RAN WG1#49bis, Orlando, USA, Jun. 25-29, 2007, Nokia Siemens Networks, Nokia, "UL Sounding Reference Signal"; 5 sheets.

3$^{rd}$ Generation Partnership Project; Technical Specification Group Radio Access Network; Evolved Universal Terrestrial Radio Access (E-UTRA); Physical layer procedures (Release 8), Mar. 2008, 30 sheets.

ETSI, "*Evolved Universal Terrestrial Radio Access (E-UTRA); Physical channels and modulation*" (3GPP TS 36.211 version 8.3.0 Release 8), Nov. 2008, 81 sheets.

METHOD FOR TRANSMITTING AND RECEIVING UPLINK SOUNDING REFERENCE SIGNAL, BASE STATION AND MOBILE TERMINAL

CROSS-REFERENCE TO RELATED APPLICATIONS

The present application is a US National Stage of International Application No. PCT/CN2009/000683, filed 19 Jun. 2009, designating the United States, and claiming priority to Chinese Patent Application No. 200810115312.1 filed 20 Jun. 2008.

FIELD OF THE INVENTION

The present invention relates to the field of wireless communication and particularly to a technology for transmitting uplink sounding reference signals by a mobile terminal with multiple transmission antennas.

BACKGROUND OF THE INVENTION

An uplink Sounding Reference Signal (SRS) is an uplink signal transmitted from a mobile terminal, and a base station performs operations of uplink timing detection, power control, uplink scheduling in the frequency domain, link adaptation, etc., according to uplink channel status information provided in the SRS upon reception of the SRS. For a Time Division Duplex (TDD) system, when Multiple Input Multiple Output (MIMO) transmission based on preprocessing is used for downlink transmission, the base station may also perform channel estimation from the SRS and further derive downlink Channel State Information (CSI) due to the symmetry of the uplink and downlink channels.

Before the mobile terminal transmits an SRS to the base station, the base station needs to configure a radio frequency transmission module of the mobile terminal with some parameters and send these parameters to the mobile terminal via signaling, and the mobile terminal configures the radio frequency transmission module with these parameters upon reception of the parameters, so that the radio frequency transmission module may transmit the SRS over a transmission antenna according to the parameters configured by the base station. Upon reception of the SRS transmitted from the mobile terminal, the base station can parse the SRS to derive the parameters thereof and determine from the parameters derived from the SRS the mobile terminal transmitting the SRS.

Typically, the base station configures the radio frequency transmission module of the mobile terminal with the parameters including a duration, a cycle and a specific symbol location for transmitting an SRS, a frequency domain location and a frequency hop pattern for transmitting the SRS, and a Transmission Comb (TC) value and a Cyclic Shift (CS) value.

Figure 1:
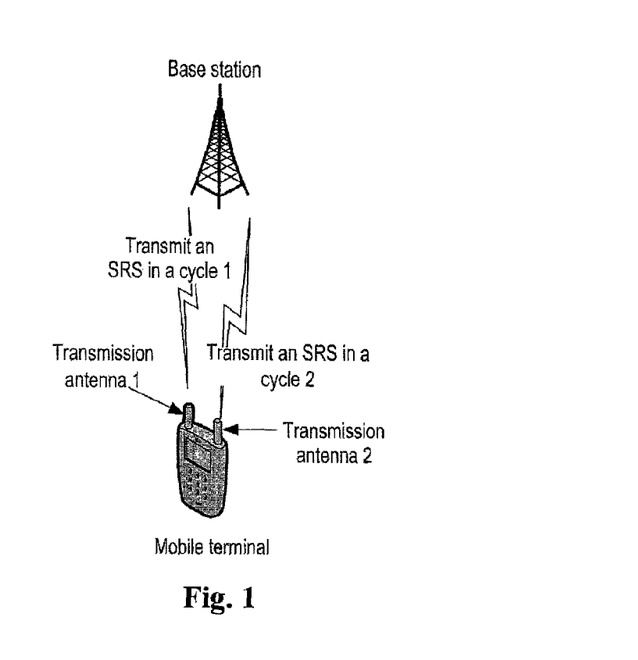
FIG. 1 illustrates a schematic diagram of transmitting SRSs from a mobile terminal with multiple transmission antennas to a base station in the prior art.
Figure 2:
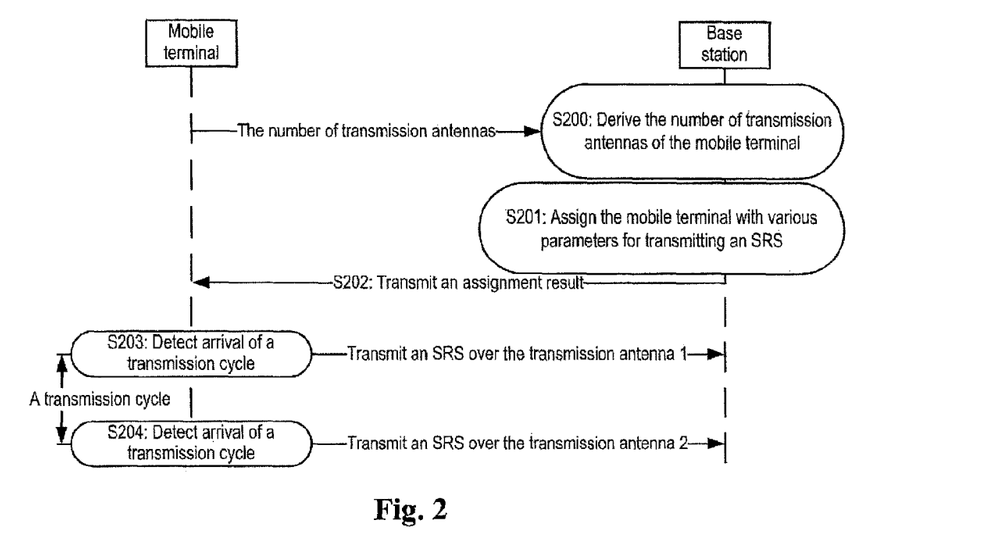
FIG. 2 illustrates a flow diagram of transmitting SRSs from a mobile terminal with multiple transmission antennas to a base station in the prior art.

The inventors of the invention have identified that existing mobile terminals provided with two or more transmission antennas cannot support concurrent transmission of SRSs over the transmission antennas and have to transmit the SRSs alternatively. FIG. 1 illustrates a schematic diagram of transmitting SRSs from a mobile terminal with two transmission antennas to a base station in the prior art in a specific transmission flow as illustrated in FIG. 2 including the following steps.

S200: the base station derives the number of transmission antennas of the mobile terminal.

The base station can derive the number of transmission antennas of the mobile terminal when the mobile terminal gains an access thereto.

S201: the base station assigns the mobile terminal with various parameters for transmitting SRSs.

The base station assigns the mobile terminal with various parameters for transmitting SRSs including a duration, a transmission cycle and a specific symbol location for transmitting an SRS, a frequency domain location and a frequency hop pattern for transmitting the SRS, and a TC value and a CS value.

S202: the base station transmits a result of assignment to the mobile terminal via dedicated signaling.

S203: upon reception of the result of assignment transmitted from the base station, the mobile terminal transmits an SRS to the base station according to the result of assignment over a transmission antenna 1 upon detection of arrival of an SRS transmission cycle (called a transmission cycle for short hereinafter).

The mobile terminal transmits an SRS to the base station in a transmission cycle which typically may be 2 ms, 5 ms, 10 ms, 20 ms, 40 ms, 80 ms, 160 ms, 320 ms, etc. In other words, the mobile terminal which has transmitted an SRS transmits another SRS at an interval of one transmission cycle. The mobile terminal transmits the SRS to the base station over the transmission antenna 1 according to the result of assignment, i.e., the assigned parameters including the TC value and the CS value, sent from the base station.

S204: the mobile terminal transmits an SRS to the base station over a transmission antenna 2 according to the result of assignment upon detection of arrival of another transmission cycle.

The transmission antenna 2 is configured with the same parameters as those configured in the previous step S203 for the transmission antenna 1, and both of the transmission antennas 1 and 2 transmit the SRSs to the base station according to the assigned parameters (including the TC value and the CS value) sent from the base station.

The foregoing steps S203 and S204 are repeated, so that the SRSs are transmitted over the two transmission antennas of the mobile terminal in different transmission cycles alternatively at the same time and frequency domain location and with the same TC value and CS value, and the base station determines, from the number of transmission antennas of the mobile terminal, over which corresponding one of the transmission antennas the SRSs received in any of the different transmission cycles is transmitted, for example, the SRSs are transmitted over the transmission antenna 1 upon arrival of transmission cycles 1, 3, 5, 7 . . . and over the transmission antenna 2 upon arrival of transmission cycles 2, 4, 6, 8 . . . , and then the base station determines from the number (i.e., 2) of transmission antennas that the SRSs received in the transmission cycles 1, 3, 5, 7 . . . are transmitted over the transmission antenna 1 and the SRSs received in the transmission cycles 2, 4, 6, 8 . . . are transmitted over the transmission antenna 2. Such transmission mode of SRSs over multiple transmission antennas of a mobile terminal in the prior art is also referred to as Time Division Multiplexing (TDM) mode.

The inventors of the invention have identified that SRSs can not be transmitted concurrently (i.e., in the same transmission cycle) over multiple transmission antennas of a mobile terminal in the prior art, and a cycle in which an SRS is transmitted over one of the transmission antennas is essentially equivalent to N transmission cycles, where N is equal to the number of the transmission antennas of the mobile terminal. In other words, an SRS may be transmitted again to the base station over a transmission antenna of the mobile terminal only after two or more transmission cycles. Since an SRS is transmitted over a transmission antenna at a too long interval, the base station typically can not know accurately uplink channel status information of respective transmission antennas from the transmitted SRSs and consequently can not perform accurate channel estimation on the respective transmission antennas.

SUMMARY OF THE INVENTION

Embodiments of the invention provide a method for receiving uplink sounding reference signals and a base station, so that the base station can receive uplink sounding reference signals transmitted over multiple transmission antennas in the same transmission cycle from multiple radio frequency transmission modules of a mobile terminal.

Embodiments of the invention provide a method for transmitting uplink sounding reference signals and a mobile terminal, so that multiple radio frequency transmission modules of the mobile terminal can transmit uplink sounding reference signals over multiple transmission antennas in the same transmission cycle.

A method for receiving uplink sounding reference signals includes:

receiving uplink Sounding Reference Signals, SRSs, transmitted from radio frequency transmission modules of a mobile terminal according to respective Transmission Comb, TC, values and Cyclic Shift, CS, values assigned for the radio frequency transmission modules upon arrival of a transmission cycle, wherein any two of the radio frequency transmission modules are assigned with different TC values and/or different CS values; and determining, from the respective TC values and CS values assigned for the radio frequency transmission modules, one of the radio frequency transmission modules corresponding to each of the received SRSs.

A method for transmitting uplink sounding reference signals includes:

detecting arrival of a transmission cycle; and controlling radio frequency transmission modules to transmit SRSs according to respective TC values and CS values assigned for the radio frequency transmission modules upon arrival of the transmission cycle, wherein any two of the radio frequency transmission modules are assigned with different TC values and/or different CS values.

A base station includes:

a signal reception module adapted to receive SRSs transmitted from radio frequency transmission modules of a mobile terminal according to respective TC values and CS values assigned for the radio frequency transmission modules upon arrival of a transmission cycle, wherein any two of the radio frequency transmission modules are assigned with different TC values and/or different CS values; and a signal determination module adapted to determine, from the respective TC values and CS values assigned for the radio frequency transmission modules, one of the radio frequency transmission modules corresponding to each of the SRSs received by the signal reception module.

A mobile terminal includes multiple transmission antennas for transmitting SRSs and further includes:

a cycle detection module adapted to detect arrival of a transmission cycle; and a signal transmission module adapted to control radio frequency transmission modules to transmit the SRSs according to respective TC values and CS values assigned for the radio frequency transmission modules when the cycle detection module detects arrival of the transmission cycle, wherein any two of the radio frequency transmission modules are assigned with different TC values and/or different CS values.

Since the radio frequency transmission modules of the mobile terminal are assigned with different TC values and/or different CS values in the embodiments of the invention, the radio frequency transmission modules can transmit the SRSs over the multiple transmission antennas through FDM or CDM in the same transmission cycle according to the respective TC values and CS values assigned for the radio frequency transmission modules, so that the base station can derive more accurate uplink channel status information and perform more accurate channel estimation.

DETAILED DESCRIPTION OF THE EMBODIMENTS

In a technical solution according to an embodiment of the invention, a mobile terminal is provided with radio frequency transmission modules, and a base station configures the respective radio frequency transmission modules of the mobile terminal with different parameters, so that the respective radio frequency transmission modules of the mobile terminal can transmit SRSs over respective transmission antennas connected therewith in the same transmission cycle while these concurrently transmitted SRSs will not interfere with each other. For example, after multiple radio frequency transmission modules of the mobile terminal have been configured with the different parameters, the respective radio frequency transmission modules transmit the SRSs through FDM or CDM over the respective transmission antennas connected therewith, so that the SRSs transmitted from the (multiple) radio frequency transmission modules over the (multiple) transmission antennas will not interfere with each other, that is, the SRSs can be transmitted over the multiple transmission antennas of the mobile terminal in the same SRS transmission cycle.

Figure 3:
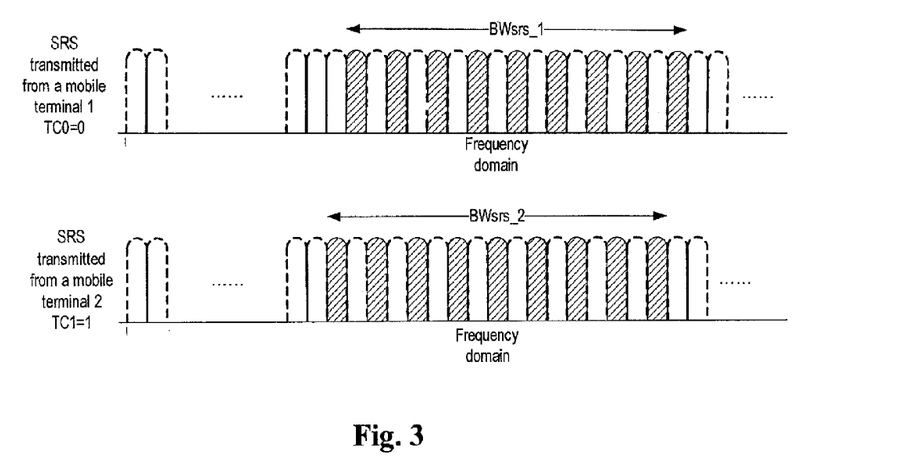
FIG. 3 illustrates a schematic diagram of transmitting SRSs from different mobile terminals through Frequency Division Multiplex (FDM) in the prior art.

The FDM will be firstly introduced now. An SRS of a mobile terminal has to be modulated onto a carrier for transmission to a base station. The base station assigns the mobile terminal with a frequency domain of the carrier, so that different mobile terminals transmit SRSs over carriers in different frequency domains, and thus the SRSs transmitted from the mobile terminals will not interfere with each other. Furthermore, sub-carriers of a carrier in the same frequency domain can be offset from each other in the frequency domain by a TC value. Therefore, SRSs transmitted from the mobile terminals can be made not interfere with each other by configuring the mobile terminals with different TC values. As illustrated in FIG. 3, a mobile terminal 1 and a mobile terminal 2 transmit SRSs at the same symbol location, and a sounding bandwidth BWsrs_1 of the mobile terminal 1 overlaps partially with a sounding bandwidth BWsrs_2 of the mobile terminal 2; and a base station assigns the mobile terminal 1 with TC0 and the mobile terminal 2 with TC1, then SRSs of the two mobile terminals are offset from each other in frequency domains. Thus, the different mobile terminals transmit the SRSs through FDM according to the assigned different TC values, and the base station receives the SRSs in the different frequency domains and determines the respective mobile terminals from which the signals in the respective frequency domains originate. As can be apparent from the foregoing description, the SRSs with different TC values will not interfere with each other.

Figure 4:
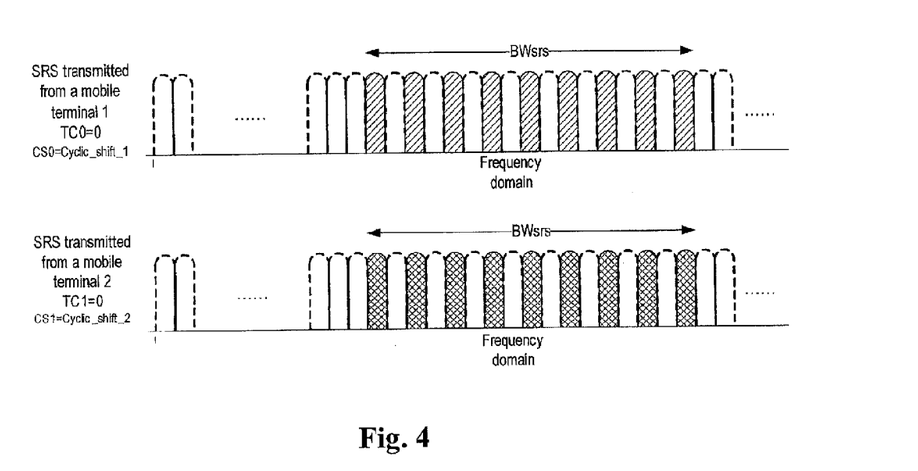
FIG. 4 illustrates a schematic diagram of transmitting SRSs from different mobile terminals through Code Division Multiplex (CDM) in the prior art.

Regarding CDM, when different mobile terminals transmit SRSs over the same time and frequency resources (here the same time and frequency resources refer one with the same symbol location, starting location of a bandwidth and TC value), a base station assigns the mobile terminals with different CS values, and then the different mobile terminals use sequences (orthogonal to each other) resulted from different cyclic shifting performed on the same basic sequence (a ZadeOff-Chu sequence generated as prescribed in a physical layer standard and determined uniquely from a cell identity (ID), an SRS bandwidth, a serial number of an uplink timeslot during which an SRS is transmitted, etc.), and thus the SRSs transmitted from the different mobile terminals can also be distinguished from each other. As illustrated in FIG. 4, for example, a mobile terminal 1 and a mobile terminal 2 need to sound the same segment of bandwidth (BWsrs), and both of the mobile terminals are assigned with the same TC value (TC0), then the base station assigns the mobile terminal 1 with a cyclic shift value CS0=Cyclic_shift_1 and the mobile terminal 2 with a cyclic shift value CS1=Cyclic_shift_2, and then the two mobile terminals perform cyclic shifting respectively on the same basic sequence to derive their reference signal sequences, so that the SRSs of the two mobile terminals are orthogonal in code domains. Thus, the different mobile terminals transmit the SRSs through CDM according to the assigned different CS values, and the base station receives the SRSs in the different code domains and determines the different mobile terminals from which the sequences in the different code domains originate. As can be apparent from the foregoing description, the SRSs with different CS values will not interfere with each other.

Figure 5A:
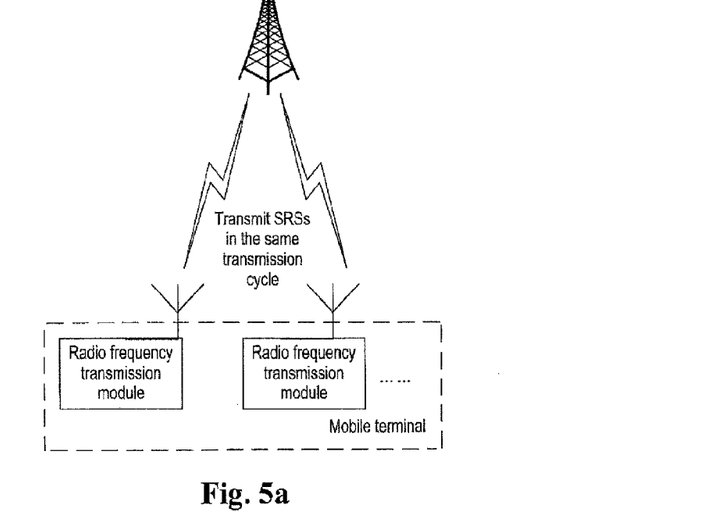
FIG. 5a illustrates a schematic diagram of transmitting SRSs from a mobile terminal with multiple radio frequency transmission modules to a base station according to an embodiment of the invention.
Figure 5B:
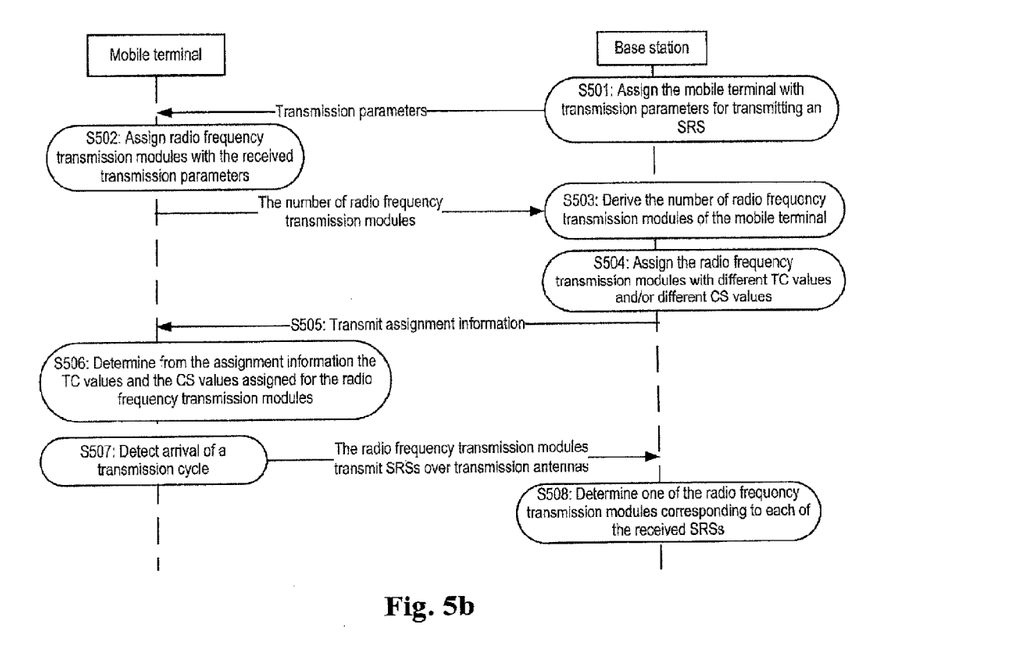
FIG. 5b illustrates a flow diagram of transmitting SRSs from a mobile terminal with multiple radio frequency transmission modules to a base station according to an embodiment of the invention.

FIG. 5a illustrates a schematic diagram of transmitting SRSs by a mobile terminal over multiple transmission antennas in the same SRS transmission cycle according to an embodiment of the invention. The mobile terminal is provided with multiple radio frequency transmission modules and multiple transmission antennas, and the respective radio frequency transmission modules are connected with one or more of the transmission antennas. The multiple radio frequency transmission modules transmit SRSs over the multiple transmission antennas in the same SRS transmission cycle in a specific flow as illustrated in FIG. 5b including the following steps.

S501: A base station assigns the mobile terminal with transmission parameters including a duration, a transmission cycle and a specific symbol location for transmitting an SRS, and a frequency domain location and a frequency hop pattern for transmitting the SRS, and transmits these transmission parameters to the mobile terminal.

The base station may transmit these transmission parameters to the mobile terminal via high layer signaling, e.g., Radio Resource Control (RRC) signaling, or physical layer signaling, e.g., Physical Downlink Control Channel (PDCCH) signaling.

S502: The mobile terminal configures the transmission antennas with these received transmission parameters.

S503: The base station derives the number of radio frequency transmission modules of the mobile terminal.

The mobile terminal reports the number of radio frequency transmission modules to the base station, and the base station receives the number of radio frequency transmission modules reported by the mobile terminal. Since the multiple radio frequency transmission modules are configured in the mobile terminal to transmit SRSs concurrently over the different transmission antennas, the base station shall derive the number of radio frequency transmission modules of the mobile terminal and hereby assign the radio frequency transmission modules with TC values and CS values according to the number of radio frequency transmission modules.

S504: The base station assigns the radio frequency transmission modules of the mobile terminal with different TC values and/or different CS values.

The base station assigns the radio frequency transmission modules with different TC values and/or different CS values, that is, the base station assigns any two of these radio frequency transmission modules with different TC values and/or different CS values. In other words, the any two radio frequency transmission modules will not be assigned with the same TC values and CS values (TC values and/or CS values are different between the any two radio frequency transmission modules), so that it is possible to ensure the SRSs transmitted concurrently from the any two radio frequency transmission modules over the different transmission antennas to be distinguished from each other, that is, ensure the any two radio frequency transmission modules transmit the SRSs through FDM or CDM over the different transmission antennas.

Specifically, the base station may assign the radio frequency transmission modules of the mobile terminal with TC values and CS values in various ways as will be introduced hereinafter.

It shall be noted that if the base station assigns the radio frequency transmission modules of the mobile terminal with TC values and CS values according to a default number of radio frequency transmission modules, the mobile terminal does not need to report the number of radio frequency transmission modules to the base station.

S505: The base station transmits assignment information on current assignment to the mobile terminal.

The base station may transmit assignment information on assigning the radio frequency transmission modules with the TC values and CS values to the mobile terminal via high layer signaling (e.g., RRC signaling) or physical layer signaling (e.g., PDCCH signaling). The base station may transmit various assignment information as will be introduced hereinafter.

S506: The mobile terminal determines from the assignment information the TC values and the CS values assigned by the base station for the radio frequency transmission modules upon reception of the assignment information and configures the radio frequency transmission modules with the determined TC values and CS values.

S507: The mobile terminal controls the radio frequency transmission modules to transmit the SRSs over the respective transmission antennas connected therewith upon arrival of a transmission cycle.

When the mobile terminal detects arrival of a transmission cycle, the radio frequency transmission modules configured with the transmission parameters and the different TC values and/or different CS values transmit the SRSs concurrently over the transmission antennas. That is, the mobile terminal may have the SRSs transmitted concurrently over the multiple transmission antennas upon arrival of a transmission cycle.

S508: The base station determines the radio frequency transmission modules corresponding to the received SRSs upon reception of the SRSs transmitted from the mobile terminal over the transmission antennas.

Upon reception of the SRSs, the base station may determine, from the specific symbol locations of the SRSs or the frequency domain locations for transmitting the SRSs, which mobile terminal transmits the received SRSs. How to determine which mobile terminal transmits the SRSs is well known to those skilled in the art, and a repeated description thereof is omitted here. Upon acknowledgement of reception of the SRSs transmitted from the mobile terminal over the transmission antennas, the base station compares the TC value and the CS value of each of the received SRSs with the TC values and the CS values assigned previously for the respective radio frequency transmission modules and determines that the received SRS is transmitted from one of the radio frequency transmission modules when the TC value and the CS value of the received SRS are the same as the TC value and the CS value assigned for the radio frequency transmission module.

Since the radio frequency transmission modules are assigned with different TC values and/or different CS values, they may transmit the SRSs through FDM or CDM. The SRSs transmitted through FDM or CDM can be distinguished from each other. Therefore, the radio frequency transmission modules may transmit the SRSs concurrently over the respective transmission antennas connected therewith while the concurrently transmitted SRSs can be distinguished, so that uplink sounding reference signals can be transmitted concurrently over the multiple transmission antennas of the mobile terminal in the same transmission cycle. In other words, the SRSs can be transmitted over the multiple transmission antennas upon arrival of each transmission cycle.

The base station may assign the radio frequency transmission modules of the mobile terminal with different TC values and/or different CS values in the step S504 as described above particularly in the following three schemes.

Scheme 1

The base station assigns the radio frequency transmission modules of the mobile terminal with the same TC value and different CS values. For example, the mobile terminal is provided with four radio frequency transmission modules, and then the base station assigns the four radio frequency transmission modules with the same TC value and four CS values: CS1, CS2, CS3 and CS4. Typically, the base station assigns the radio frequency transmission modules with different CS values under a specific rule. For example, a succeeding assigned CS value is larger than a preceding assigned CS value by a fixed shift, i.e., a CS shift, as shown in Formula (1):

$$CS_{n+1}=CS_n+CS\_Shift)\% m \qquad 1)$$

Where n is a natural number ranging from 1 to N, N being the number of radio frequency transmission modules, $CS_1$ is an assigned initial CS value, $CS_n$ is a CS value of the $n^{th}$ radio frequency transmission module, CS_Shift is a preset CS shift, and m is a preset positive integer. Typically, a CS value occupies 3 bits and ranges from 0 to 7, and then the CS shift may be preset as CS_Shift=2 while in is 8; and in the case of four radio frequency transmission modules, the initial CS value is $CS_1=0$, and it can be derived from Formula (1) that: $CS_2=2$, $CS_3=4$ and $CS_4=6$.

Of course, those skilled in the art may alternatively assign the radio frequency transmission modules with different CS values in other ways as required in practice. For example, equipartition is adopted in which N CS values are taken in a segment of CS values (e.g., a segment of values ranging from 0 to 7) at the same or substantially same interval, where N is the number of radio frequency transmission modules. For example, the segment of CS values ranges from 0 to 7, and two radio frequency transmission modules are provided, then the two radio frequency transmission modules may be assigned with CS1=0 and CS2=4, CS1=3 and CS2=6, etc.

In the step S505, the base station may transmit the assignment information to the mobile terminal in various ways. For example, the assignment information may contain the TC values and the CS values assigned for the radio frequency transmission modules. For example, four radio frequency transmission modules are provided, and then the transmitted assignment information includes four TC values and four CS values. The mobile terminal assigns the radio frequency transmission modules with the four pairs of TC values and CS values upon reception of the TC values and the CS values.

Alternatively, the assignment information includes a TC value and respectively different CS values. Since the base station assigns the radio frequency transmission modules of the mobile terminal with the same TC value, it is sufficient for the transmitted assignment information to contain only the TC value and the respectively different CS values. The mobile terminal configures the radio frequency transmission modules with the TC value and the respectively different CS values.

Alternatively, the assignment information includes only a TC value and a CS value. Since respectively different CS values are calculated under a specific rule, the base station transmits a CS value to the mobile terminal, and then the mobile terminal may calculate the other CS values under the same rule and configure the TC values and the CS values of the radio frequency transmission modules as the received TC value and CS value and the calculated CS values. This requires that the base station and the mobile terminal shall calculate consistently the respective CS values, and the base station and the mobile terminal may signal in advance how to determine the CS values. Alternatively, the mobile terminal may determine the CS values by default (e.g., as in Formula (1)) upon reception of a pair of TC value and CS value to configure the transmission antennas with the TC value and the CS values.

Scheme 2

The base station assigns the radio frequency transmission modules of the mobile terminal with the same CS value and different TC values. The radio frequency transmission modules may also be assigned with different TC values in analogy to the fixed-shift or equipartition method in the scheme 1 or otherwise, and a repeated description thereof is omitted here. However, it is not appropriate to take a too small interval between the respective TC values in view of a better effect of transmitting the signals. At present, if two radio frequency transmission modules are provided, TC values of two radio frequency transmission modules are inverse, i.e., TC1=! TC2, and thus the radio frequency transmission modules transmit SRSs over transmission antennas according to the assigned TC values with a better effect.

In analogy to the scheme 1, in this scheme, the base station transmits the assignment information that may include the TC values and the CS values assigned for the radio frequency transmission modules, only a CS value and respectively different TC values or only a CS value and a TC value. In the case of the assignment information including only a CS value and a TC value, the mobile terminal may calculate the other TC values from the transmitted TC value in the same way as the base station calculates the TC values and then configure the radio frequency transmission modules with the calculated TC values, the TC value and the CS value, in analogy to the scheme 1. For example, the mobile terminal is provided with two radio frequency transmission modules, and the base station assigns the two radio frequency transmission modules with the same CS value and respectively TC1 and TC2, where TC1=! TC2, then the base station transmits to the mobile terminal the assignment information including the CS value and TC1, and the mobile terminal inverses TC1 to derive TC2: TC2=! TC1. Thus, the mobile terminal configures the radio frequency transmission module 1 with TC1 and the CS value and the radio frequency transmission module 2 with TC2 and the CS value.

Scheme 3

The base station assigns the radio frequency transmission modules of the mobile terminal with different CS values and different TC values, that is, any two of the radio frequency transmission modules are assigned with different CS values and different TC values. In this case, the respectively different CS values may also be calculated under a specific rule, and the respectively different TC values may also be calculated under a specific rule. All of the TC values and the CS values assigned for the radio frequency transmission modules or only a pair of TC value and CS value may be transmitted as the assignment information, and the mobile terminal may calculate the other TC values and CS values from the pair of TC value and CS value in the assignment information in the same formulas of calculating the TC values and the CS values as the base station.

Of course, the base station may assign the radio frequency transmission modules of the mobile terminal with the TC values and the CS values in combination of the methods in the scheme 1 and the scheme 2 as described above, that is, some of the radio frequency transmission modules are assigned with the same TC value and different CS values, and some ones are assigned with the same CS value and different TC values; or further in combination with the assignment method in the scheme 3, where some of the radio frequency transmission modules are assigned with different TC values and different CS values from the other ones.

It shall be noted that the number of transmission antennas of the mobile terminal may be the same as the number of radio frequency transmission modules, that is, a radio frequency transmission module is connected correspondingly with a transmission antenna; or the number of transmission antennas may be larger than the number of radio frequency transmission modules, and thus several transmission antennas share a radio frequency transmission module as in the prior art, and a repeated description thereof is omitted here.

Figure 6:
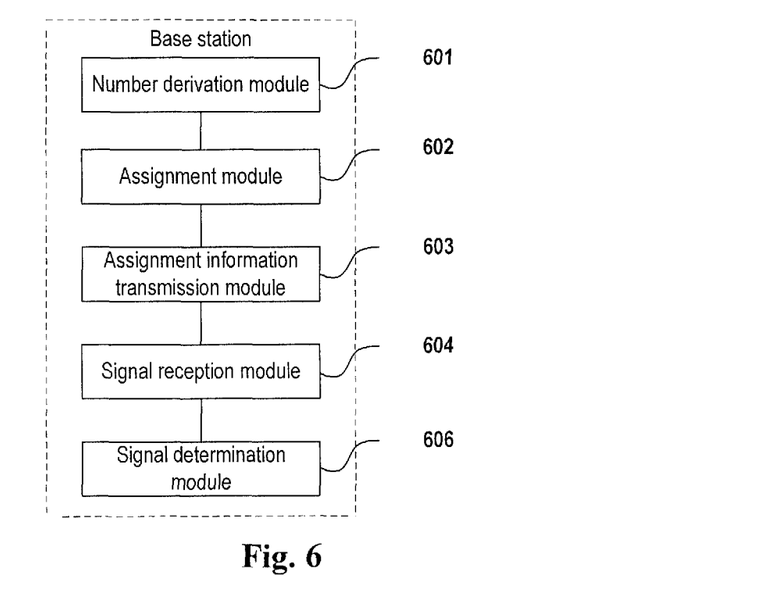
FIG. 6 illustrates a schematic diagram of an internal structure of a base station according to an embodiment of the invention.

FIG. 6 illustrates a base station for receiving uplink sounding reference signals transmitted from a mobile terminal according to an embodiment of the invention, which includes a signal reception module 604 and a signal determination module 606.

The signal reception module 604 is adapted to receive SRSs transmitted from radio frequency transmission modules over respective transmission antennas connected therewith. The SRSs are transmitted concurrently from the radio frequency transmission modules over the respective transmission antennas connected therewith according to respective TC values and CS values configured for the radio frequency transmission modules upon arrival of each transmission cycle after the mobile terminal configures the radio frequency transmission modules with the TC values and the CS values according to assignment information transmitted from the base station, where any two of the radio frequency transmission modules are assigned with different TC values and/or different CS values.

The signal determination module 606 is adapted to determine, from the TC values and the CS values of the SRSs received by the signal reception module 604, one of the radio frequency transmission module corresponding to each of the SRSs, after the signal reception module 604 receives the SRSs transmitted over the transmission antennas.

Further, the base station includes:

an assignment module 602 adapted to assign the radio frequency transmission modules of the mobile terminal with the TC values and the CS values. The assignment module 602 may assign the radio frequency transmission modules with the TC values and the CS values in any one or combination of the methods in the schemes 1 to 3 as described above;

an assignment information transmission module 603 adapted to transmit the assignment information on current assignment to the mobile terminal according to an assignment result of the assignment module 602. The assignment information transmission module 603 may transmit the assignment information including various information as described above, and a repeated description thereof is omitted here.

The base station further includes:

a number derivation module 601 adapted to derive the number of radio frequency transmission modules reported from the mobile terminal.

The assignment module 602 is further adapted to assign the radio frequency transmission modules of the mobile terminal with the TC values and the CS values according to the number of radio frequency transmission modules derived by the number derivation module 601.

Figure 7:
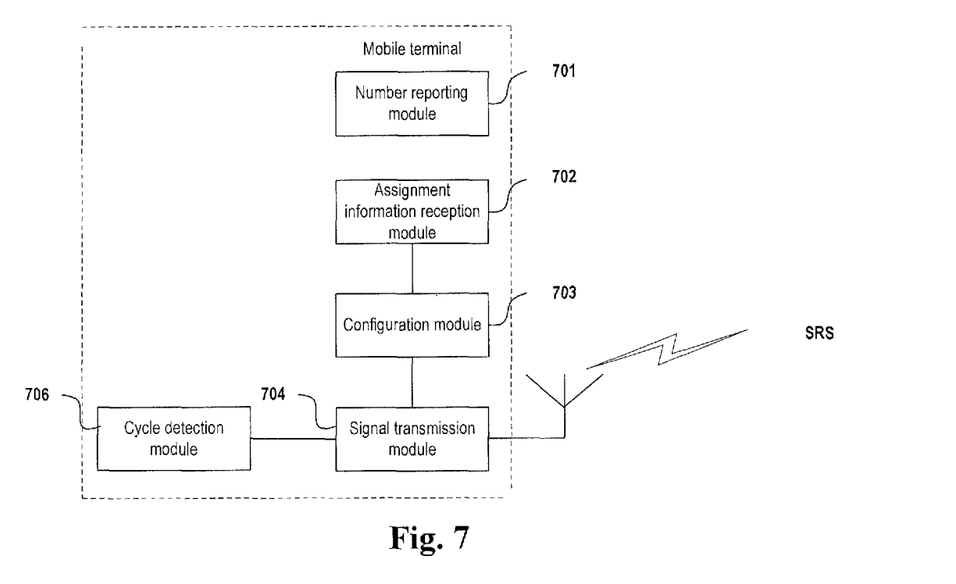
FIG. 7 illustrates a schematic diagram of an internal structure of a mobile terminal according to an embodiment of the invention.

An embodiment of the invention provides a mobile terminal for transmitting uplink sounding reference signals as illustrated in FIG. 7, which includes multiple transmission antennas (not illustrated), a signal transmission module 704 and a cycle detection module 706.

The cycle detection module 706 is adapted to detect arrival of a transmission cycle.

The signal transmission module 704 is adapted to control radio frequency transmission modules to transmit the SRSs according to respective TC values and CS values assigned for the radio frequency transmission modules when the cycle detection module 706 detects arrival of a transmission cycle, where any two of the radio frequency transmission modules are assigned with different TC values and/or different CS values.

Furthermore, the mobile terminal includes:

an assignment information reception module 702 adapted to receive assignment information on the TC values and the CS values assigned by a base station for the radio frequency transmission modules according to the number of radio frequency transmission modules;

a configuration module 703 adapted to determine, from the assignment information received by the assignment information reception module 702, the TC values and the CS values assigned by the base station for the radio frequency transmission modules and configure the radio frequency transmission modules according to a determination result. Specifically, the configuration module 703 determines from the assignment information the TC values and the CS values assigned for the radio frequency transmission modules and configures the radio frequency transmission modules with the determined TC values and CS values.

The mobile terminal further includes:

a number reporting module 701 adapted to report the number of radio frequency transmission modules to the base station.

Figure 8:
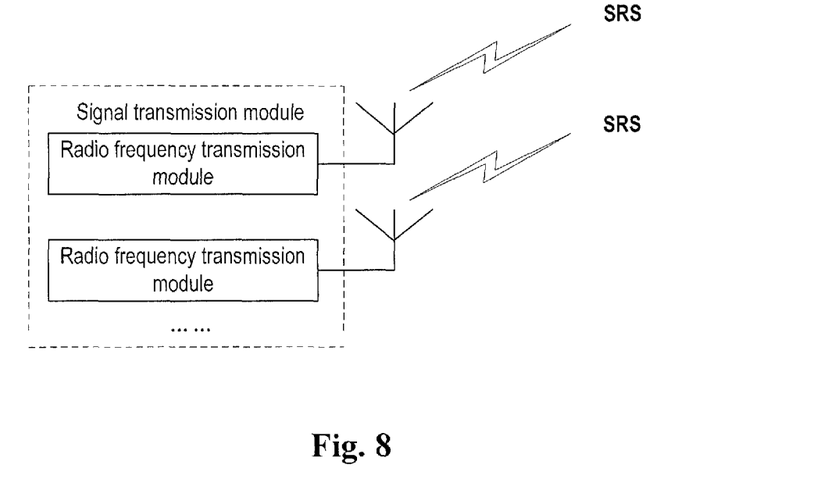
FIG. 8 illustrates a schematic diagram of an internal structure of a signal transmission module according to an embodiment of the invention.

The signal transmission module 704 includes multiple radio frequency transmission modules (as illustrated in FIG. 8), each of which is connected with one or more transmission antennas, the radio frequency transmission modules are adapted to transmit the SRSs over the transmission antennas connected therewith according to the TC values and the CS values configured by the configuration module 703.

Since the radio frequency transmission modules of the mobile terminal are assigned with different TC values and/or different CS values in the embodiments of the invention, the radio frequency transmission modules may transmit the SRSs over the multiple transmission antennas through FDM or CDM in the same transmission cycle according to the respective TC values and CS values assigned for the radio frequency transmission modules, so that the base station can derive more accurate uplink channel status information and perform more accurate channel estimation.

Although the base station assigns the radio frequency transmission modules with different TC values and/or different CS values, it transmits to the mobile terminal the assignment information including only a TC value and a CS value, and the mobile terminal determines, from the TC value and the CS value in the assignment information, the TC values and the CS values assigned by the base station for the transmission antennas, so that the assignment information transmitted from the base station occupies few bits in signaling, thereby saving a resource over the air.

Those ordinarily skilled in the art can appreciate that all or a part of steps in the methods according to the foregoing embodiments may be performed via a program instructing relevant hardware, the program may be stored in a computer readable storage medium, e.g., an ROM/RAM, a magnetic disk, an optical disk, etc.

The foregoing description is merely illustrative of preferred embodiments of the invention, and it shall be noted that those ordinarily skilled in the art can further make various modifications and variations without departing from the principle of the invention and these modifications and variations shall also be construed as coming into the scope of the invention.

The invention claimed is:

1. A method for receiving uplink sounding reference signals, comprising:

receiving uplink Sounding Reference Signals, SRSs, transmitted from radio frequency transmission modules of a mobile terminal according to respective Transmission Comb, TC, values and Cyclic Shift, CS, values assigned for the radio frequency transmission modules upon arrival of a transmission cycle, wherein any two of the radio frequency transmission modules are assigned with different TC values and/or different CS values; and determining, from the respective TC values and CS values assigned for the radio frequency transmission modules, one of the radio frequency transmission modules corresponding to each of the received SRSs.

2. The method of claim 1, further comprising: before receiving the SRSs transmitted from the radio frequency transmission modules of the mobile terminal according to the respective TC values and CS values assigned for the radio frequency transmission modules upon arrival of a transmission cycle, assigning the radio frequency transmission modules with the TC values and the CS values and transmitting assignment information to the mobile terminal.

3. The method of claim 2, further comprising: before assigning the radio frequency transmission modules with the TC values and the CS values, deriving the number of radio frequency transmission modules of the mobile terminal, wherein assigning the radio frequency transmission modules with the TC values and the CS values comprises assigning the radio frequency transmission modules with the TC values and the CS values according to the derived number of radio frequency transmission modules.

4. The method of claim 2, wherein assigning the radio frequency transmission modules with the TC values and the CS values comprises:

assigning the radio frequency transmission modules with the same TC value and different CS values; or assigning the radio frequency transmission modules with the same CS value and different TC values; or assigning any two of the radio frequency transmission modules with different CS values and different TC values.

5. The method of claim 4, wherein assigning the radio frequency transmission modules with the different CS values based on the following formula:

$$CS_{n+1}=(CS_n+CS\_Shift)\% m$$

wherein n is a natural number ranging from 1 to N, N being the number of radio frequency transmission modules, $CS_n$ is a CS value of the $n^{th}$ radio frequency transmission module, CS_Shift is a preset CS shift, and m is a preset positive integer.

6. The method of claim 5, wherein the assignment information comprises the same TC value and one of the different CS values.

7. The method of claim 4, wherein the number of radio frequency transmission modules is two, and wherein assigning the radio frequency transmission modules with the different TC values comprises:

assigning the two radio frequency transmission modules respectively with TC1 and TC2, wherein TC1=! TC2.

8. The method of claim 7, wherein the assignment information comprises the same CS value and one of the different TC values.

9. The method of claim 2, wherein the assignment information comprises all of the TC values and the CS values assigned for the radio frequency transmission modules.

10. A method for transmitting uplink sounding reference signals, comprising:
   detecting arrival of a transmission cycle; and
   controlling radio frequency transmission modules to transmit SRSs according to respective TC values and CS values assigned for the radio frequency transmission modules upon arrival of the transmission cycle, wherein any two of the radio frequency transmission modules are assigned with different TC values and/or different CS values.

11. The method of claim 10, further comprising: before controlling the radio frequency transmission modules to transmit the SRSs according to the respective TC values and CS values assigned for the radio frequency transmission modules,
   receiving assignment information on the TC values and the CS values assigned by a base station for the radio frequency transmission modules; and
   determining, from the assignment information, the TC values and the CS values assigned by the base station for the radio frequency transmission modules.

12. The method of claim 11, further comprising: before receiving the assignment information on the TC values and the CS values assigned by the base station for the radio frequency transmission modules,
   reporting the number of radio frequency transmission modules to the base station,
   wherein the TC values and the CS values assigned by the base station for the radio frequency transmission modules are determined according to the number of radio frequency transmission modules.

13. The method of claim 11, wherein the TC values and the CS values assigned for the radio frequency transmission modules comprise:
   the same TC value and different CS values of the radio frequency transmission modules; or
   the same CS value and different TC values of the radio frequency transmission modules; or
   different CS values and different TC values of the radio frequency transmission modules.

14. The method of claim 13, wherein the assignment information comprises the same TC value and one of the different CS values assigned for the radio frequency transmission modules; and
   wherein determining, from the assignment information, the TC values and the CS values assigned by the base station for the radio frequency transmission modules comprises:
   determining, from the TC value in the assignment information, the same TC value to be configured for the radio frequency transmission modules;
   determining the different CS values from the one CS value in the assignment information; and
   determining the determined different CS values to be configured for the radio frequency transmission modules;
   or
   wherein the assignment information comprises the same CS value and one of the different TC values assigned for the radio frequency transmission modules; and
   wherein determining, from the assignment information, the TC values and the CS values assigned by the base station for the radio frequency transmission modules comprises:
   determining, from the CS value in the assignment information, the same CS value to be configured for the radio frequency transmission modules;
   determining the different TC values from the one TC value in the assignment information; and
   determining the determined different TC values to be configured for the radio frequency transmission modules;
   or
   wherein the assignment information comprises all of the TC values and the CS values assigned for the radio frequency transmission modules.

15. A mobile terminal, comprising multiple transmission antennas for transmitting SRSs and further comprising:
   a cycle detection module adapted to detect arrival of a transmission cycle; and
   a signal transmission module adapted to control radio frequency transmission modules to transmit the SRSs according to respective TC values and CS values assigned for the radio frequency transmission modules when the cycle detection module detects arrival of the transmission cycle, wherein any two of the radio frequency transmission modules are assigned with different TC values and/or different CS values.

16. The mobile terminal of claim 15, further comprising:
   an assignment information reception module adapted to receive assignment information on the TC values and the CS values assigned by a base station for the radio frequency transmission modules; and
   a configuration module adapted to determine, from the assignment information received by the assignment information reception module, the TC values and the CS values assigned by the base station for the radio frequency transmission modules and configure the radio frequency transmission modules according to a determination result.

17. The mobile terminal of claim 16, further comprising:
   a number reporting module adapted to report the number of radio frequency transmission modules to the base station.

* * * * *